(12) United States Patent
Mornacchi et al.

(10) Patent No.: US 12,717,359 B2
(45) Date of Patent: Aug. 25, 2026

(54) PRESSURE REGULATING SHUT-OFF VALVE

(71) Applicant: Microtecnica S.r.l., Turin (IT)

(72) Inventors: Andrea Mornacchi, Turin (IT); Enrico Quaglia, Chieri (IT); Matteo Cappo, Turin (IT)

(73) Assignee: Microtecnica S.r.l., Turin (IT)

( * ) Notice: Subject to any disclaimer, the term of this patent is extended or adjusted under 35 U.S.C. 154(b) by 0 days.

(21) Appl. No.: 18/476,658

(22) Filed: Sep. 28, 2023

(65) Prior Publication Data

US 2024/0111316 A1 Apr. 4, 2024

(30) Foreign Application Priority Data

Oct. 3, 2022 (EP) .................................... 22199392

(51) Int. Cl.
*G05D 16/16* (2006.01)
*B64D 15/16* (2006.01)
*F16K 1/12* (2006.01)

(52) U.S. Cl.
CPC ........... *G05D 16/166* (2013.01); *B64D 15/16* (2013.01); *F16K 1/126* (2013.01); *Y10T 137/3367* (2015.04)

(58) Field of Classification Search
CPC ... F01D 25/02; D16K 1/126; Y10T 134/3367; Y10T 134/3421; Y10T 134/87917
See application file for complete search history.

(56) References Cited

U.S. PATENT DOCUMENTS 430,089 A 6/1890 Sewall
1,387,446 A * 8/1921 Astier ....................... F16K 1/12 137/219
1,936,650 A * 11/1933 Wade ........................ F16K 1/12 137/220
2,085,893 A * 7/1937 Boland .................. F16K 1/126 251/44
2,495,081 A * 1/1950 Thomas .................... F16K 1/12 137/553
3,297,047 A * 1/1967 Sime .................... F16K 31/406 137/220
3,380,469 A * 4/1968 Salerno ................. B64D 13/06 251/44
5,031,661 A 7/1991 Feuz
10,712,754 B2 7/2020 Quaglia et al.
(Continued)

FOREIGN PATENT DOCUMENTS

GB 1295092 A 11/1972

OTHER PUBLICATIONS

European Search Report for Application No. 22199392.6, mailed Mar. 20, 2023, 8 pages.

*Primary Examiner* — Robert K Arundale
(74) *Attorney, Agent, or Firm* — Kilpatrick Townsend & Stockton LLP

(57) ABSTRACT

A pressure regulating shut-off valve (PRSOV) for an aircraft anti-ice system includes a valve body defining an inlet and an outlet and a fluid flow path between the inlet and the outlet. The valve includes a first piston is operable as a shut-off piston, a second piston is operable as a shut-off piston and as a regulating piston and a third piston is operable as a regulating piston, the third piston being actuable to regulate flow between the inlet and the outlet.

12 Claims, 3 Drawing Sheets

(56) References Cited

U.S. PATENT DOCUMENTS

| | | | | |
|---|---|---|---|---|
| 2003/0075217 | A1* | 4/2003 | Etheridge | F16K 3/265 137/219 |
| 2015/0034767 | A1 | 2/2015 | Pirat | |
| 2016/0200442 | A1 | 7/2016 | Jones | |
| 2017/0220055 | A1* | 8/2017 | Quaglia | F16K 27/00 |
| 2018/0010519 | A1 | 1/2018 | Goodman et al. | |
| 2018/0163892 | A1* | 6/2018 | Carpignano | F16K 31/1223 |
| 2018/0209349 | A1* | 7/2018 | Greenberg | F16K 1/126 |
| 2019/0032814 | A1* | 1/2019 | Zecchi | F16K 1/123 |
| 2020/0032806 | A1 | 1/2020 | Franconi et al. | |

* cited by examiner

PRESSURE REGULATING SHUT-OFF VALVE

CROSS REFERENCE TO RELATED APPLICATIONS

This application claims priority to European Patent Application No. 22199392.6 filed Oct. 3, 2022, the entire contents of which is incorporated herein by reference.

FIELD OF THE INVENTION

The present invention concerns a pressure regulating shut-off valve, and particularly a pneumatic anti-ice pressure regulating shut-off valve for use in the field of aeronautics.

BACKGROUND

Solenoid controlled pressure regulating and shut-off valves (PRSOV) are designed to operate in the inlet of an anti-ice system of an aircraft engine. The PRSOV is a compact unit which may provide multiple functions. The PRSOV may provide a regulating function for regulating downstream engine bleed air pressures. The regulating function typically aims to provide constant outlet pressure regardless of inlet pressure and flow rate. The regulating function is provided by a regulating piston and an associated pressure relief valve. The PRSOV may also provide a shut-off function for stopping downstream engine bleed air. The shut-off function may be used to deactivate the anti-icing system in certain flight conditions and to isolate the pneumatic lines downstream of the valve in case of failure.

The shut-off function is considered mandatory for safety reasons. The regulating function is considered important but not mandatory. Pressure relief valves and regulating pistons may fail due to e.g. metal particles present in the working fluid. In the event of failure of the pressure relief valve or the regulating piston, the relevant regulating piston can be locked open by a manual override device, leading to loss of the regulation function.

A known PRSOV comprises two pistons within sleeves defined by a main body of the valve. A shut-off piston provides the shut-off function and a regulating piston provides the regulating function. The shut-off piston is pneumatically operated and electrically controlled by an on-board mounted solenoid valve, while the regulating piston is controlled by a pressure relief valve. Both functions are achieved using the inlet pressure and flow as power to the control elements, that is, to the shut-off piston and the regulating piston. When the solenoid valve is in a first configuration (e.g. de-energized), the shut-off piston remains in an open position and the regulating piston operates to provide the regulating function. When the solenoid valve is in a second configuration (e.g. energized), the shut-off piston moves to a closed position and flow is stopped. A manual override is often included which enables locking of the regulating piston in the fully open position in the event of failure of the pressure relief valve or the regulating piston. In this event, the shut-off piston still provides the shut-off function, but the regulating function is lost. The known dual piston PRSOV therefore provides no redundancy for the regulating function or the shut-off function.

Another known PRSOV comprises a single piston which provides both the regulating and shut-off function. The piston is controllable by a solenoid valve and by a pressure relief valve. If the pressure relief valve fails, a manual override is used to set the piston to a fully open position, and both the shut-off and regulating functions of the valve are lost. To provide redundancy, two such PRSOVs may be used in series. Such a system provides redundancy for both the regulating and shut-off functions. However, a system of two single piston PRSOVs in series has a higher overall envelope and weight than a dual piston PRSOV.

SUMMARY

According to a first aspect of the present invention, there is provided a pressure regulating shut-off valve (PRSOV) for an aircraft anti-ice system comprising: a valve body defining an inlet and an outlet, and a fluid flow path between the inlet and the outlet; a first piston operable as a shut-off piston, the first piston being actuable between a first position in which fluid flow between the inlet and the outlet is permitted, and a second position in which fluid flow between the inlet and the outlet is prevented; a second piston operable as a shut-off piston and as a regulating piston, the second piston being actuable between a first position in which fluid flow between the inlet and the outlet is permitted and a second position in which fluid flow between the inlet and the outlet is prevented, and being actuable to regulate flow between the inlet and the outlet; and a third piston operable as a regulating piston, the third piston being actuable to regulate flow between the inlet and the outlet.

The PRSOV may therefore be a triple-piston PRSOV. The PRSOV of the first aspect may provide improved redundancy for the shut-off function and the regulating function, while allowing a relatively small envelope size and weight. In normal operation, either the second piston or the third piston may provide the main regulating function depending upon the configuration of the PRSOV, and may therefore serve as a primary regulating piston. The other of the second piston and the third piston may then serve as a redundant regulating piston. If the third piston (or an associated pressure relief valve) fails, the first piston provides the shut-off function and the second piston provides the regulating function. If the second piston (or an associated pressure relief valve) fails, the first piston provides the shut-off function and the third piston provides the regulating function. Redundancy is therefore provided for the regulating function in the event of a single piston failure. If both the second piston and the third piston fail, the first piston provides the shut-off function and the regulating function is lost.

The second piston is also operable as a redundant shut-off piston. Therefore, if the first piston fails, then the second piston may provide the shut-off function. Alternatively, the second piston may provide a primary shut-off function and the first piston may provide a redundant shut-off function, depending upon the configuration of the PRSOV. Redundancy is therefore also provided for the shut-off function of the PRSOV as well as for the pressure regulating function. The PRSOV may therefore provide dual redundancy, for both the shut-off function and the pressure regulating function.

The PRSOV of the first aspect may occupy a relatively small envelope and may have a relatively low weight, because the regulating and shut-off functions and their respective redundancies are combined in a single body. Further, only three pistons are required to provide this level of redundancy. The envelope and weight of the PRSOV of the first aspect may therefore be comparable to the envelope and weight of two single piston valves in series, while providing improved redundancy. The envelope and weight of the PRSOV may be less than that of e.g. two dual piston valves in series, that might otherwise be needed to achieve the same level of redundancy.

The second piston may be actuable to regulate downstream pressure. The second piston may be actuable to any position between the first position and the second position e.g. to restrict fluid flow in the fluid flow path at that point. The second piston may be actuable based upon downstream pressure, and may thereby be operable responsive to downstream pressure changes to thereby regulate downstream pressure.

The third piston may be actuable to regulate downstream pressure. The third piston may be actuable to any position between the first position and the second position e.g. to restrict fluid flow in the fluid flow path at that point. The third piston may be actuable based upon downstream pressure, and may thereby be operable responsive to downstream pressure changes to thereby regulate downstream pressure.

Each of the first piston, the second piston, and the third piston may be distinct from each other, and each may be separately actuable. In short, they may be different pistons. The PRSOV may comprise only the first piston, second piston and third piston which are actuable to control fluid flow through the valve body. The first piston may be actuable relative to (and independently of) each of the second piston and the third piston. The second piston may be actuable relative to (and independently of) each of the first piston and the third piston. The third piston may be actuable relative to (and independently of) each of the first piston and the second piston.

The first piston may be disposed in the fluid flow path. The fluid flow path may surround the first piston. The second piston may be disposed in the fluid flow path. The fluid flow path may surround the second piston. The third piston may be disposed in the fluid flow path. The fluid flow path may surround the third piston. The first piston may be located between the inlet and the outlet. The second piston may be located between the inlet and the outlet. The third piston may be located between the inlet and the outlet. The fluid flow path may be entirely within the valve body. The first piston, second piston, and third piston may be disposed in series within the fluid flow path. The first piston, second piston and third piston may be within the valve body, and each may be entirely within the valve body. The valve body may be rigid.

The first piston may be upstream of the second piston. The first piston may be between the inlet of the valve body and the second piston. The first piston may therefore be operable to prevent fluid flow from the inlet to the second piston, and may be operable to permit fluid flow from the inlet to the second piston.

The second piston may be upstream of the third piston. The first piston may be upstream of both the second piston and the third piston. The first piston may be operable to prevent fluid flow from the inlet to the second piston and the third piston, and may be operable to permit fluid flow from the inlet to the second piston and the third piston. The second piston may be operable to regulate fluid flow from the inlet to the third piston. The second piston may be between the first piston and the third piston.

The first piston, second piston, and third piston may therefore be arranged in series within the valve body, with fluid flowing between the inlet and the outlet encountering each piston in order: first, then second, then third.

This order of the pistons may improve the stability of operation of the PRSOV, because the shut-off functions are performed by pistons located upstream of the regulating pistons. Pressure regulating pistons are prone to instability when a sudden pressure variation occurs downstream (e.g. a blockage or a leak). Indeed, a shut-off piston downstream could cause upstream regulating pistons to be unstable. In the presented configuration, with the shut-off piston(s) closer to the inlet of the PRSOV, closure and subsequent reopening of the flow passage does not create sudden pressure variations downstream of the regulating piston(s), which therefore remain stable. When the first piston operates as a shut-off piston, the regulating function is provided by the second or third piston, both of which are downstream of the first piston and so are not destabilised by the shut-off. When the second piston acts as a shut-off piston, the regulating function is provided by the third piston which is downstream of the second piston and so is not destabilised by the shut-off.

The PRSOV may comprise a solenoid valve operable to actuate the first piston. The solenoid valve may be a first solenoid valve (for example a second solenoid valve may be provided for actuating the second piston as described herein). The (first) solenoid valve may be operable to actuate the first piston by causing the first piston to move between the first and second positions. For example, when the first solenoid valve is in a first configuration (e.g. de-energised), the first piston may occupy the first position. When the first solenoid valve is in a second configuration (e.g. energised), the first piston may occupy the second position. Energising the solenoid valve may cause the first piston to move from the first position to the second position.

The valve body may define a shut-off chamber fluidly connected to the first solenoid valve. The first piston may be partially disposed in air-tight engagement with the shut-off chamber. A first surface area of the first piston (e.g. an interior) may be exposed to pressure within the shut-off chamber. A second surface area of the first piston (e.g. an exterior) may be exposed to the fluid flow path. The second surface area may be exposed to the inlet pressure. The first surface area may be greater than the second surface area, though any suitable ratio of surface areas may be used suitable for the pressures involved.

The position of the first piston may be determined by the pressure in the shut-off chamber and the inlet pressure. For example, pressure within the shut-off chamber below a predetermined threshold may cause the first piston to be in the first position (e.g. allowing fluid flow through the fluid flow path) as pressure from the inlet will force the first piston into the shut-off chamber. Pressure within the shut-off chamber above the predetermined threshold may cause the first piston to be in the second position (e.g. preventing fluid flow through the fluid flow path), overcoming pressure in the inlet.

The first solenoid valve may be arranged to control the pressure in the shut-off chamber, and thereby control the position of the first piston. The first solenoid valve may be arranged to vent the shut-off chamber (e.g. to the exterior of an aircraft) when in a first configuration (e.g. when de-energised). The inlet pressure (which may be higher than the vent pressure, for example) may then cause the first piston to occupy the first position. The shut-off chamber may be fluidly connected to the inlet pressure e.g. via an orifice or suitable throttle. Thus, when the first solenoid valve is in a second configuration (e.g. when energised) so that the shut-off chamber is not vented to atmosphere, the inlet pressure may then act on both the first and second surface areas of the first piston. However because the first surface area is greater than the second surface area, the pneumatic force exerted on the first piston from the shut-off chamber exceeds the pneumatic force exerted on the first piston from the flow path. The first piston may therefore move to the second position. Thus, the solenoid valve may be operable to actuate the first piston between its first position and second position, depending upon the configuration of the solenoid valve. Hence, the solenoid valve may be operable for the shut-off function of the PRSOV.

The PRSOV may comprise a solenoid valve operable to actuate the second piston. The solenoid valve may be a second solenoid valve (for example when a first solenoid valve for controlling the first piston is provided). The (second) solenoid valve may be operable to actuate the second piston by causing the second piston to move between the first and second positions. When the second solenoid valve is in a first configuration (e.g. de-energised), the second piston may be operable in a regulating mode (for example, see the regulating mode discussed below). In the regulating mode, the second piston may provide the regulating function. When the second solenoid valve is in a second configuration (e.g. energised), the second piston may occupy the second position. Energising the second solenoid valve may cause the second piston to move from the first position to the second position.

When the second solenoid valve is in the second configuration (e.g. energised), the second piston may provide the shut-off function.

The valve body may define a reference chamber for actuating the second piston. The reference chamber for actuating the second piston may be a first reference chamber (for example when a second reference chamber associated with the third piston is provided, as described herein). The second piston may be partially disposed in air-tight engagement with the (first) reference chamber. A first surface area of the second piston may be exposed to pressure in the (first) reference chamber, and the pressure within the reference chamber may be based upon the pressure upstream of the second piston. A second surface area of the second piston may be exposed to a pressure in the fluid flow path immediately downstream of the second piston. The first surface area may be of equal size to the second surface area. The position of the second piston may be determined by a difference in pressures between the pressure in the first reference chamber and the pressure in the fluid flow path immediately downstream of the second piston. For example, a downstream pressure higher than the pressure in the (first) reference chamber may cause the second piston to move towards its second position. A downstream pressure lower than the pressure in the (first) reference chamber may cause the second piston to move towards its first position. Thus, higher downstream pressures compared to upstream pressures may cause the second piston to reduce the fluid flow through the PRSOV. Lower downstream pressures compared to upstream pressures may cause the second piston to increase the fluid flow through the PRSOV. Thus, movement of the second piston may be responsive to upstream and downstream pressures changes and may therefore regulate fluid flow through the PRSOV based thereupon.

The second piston may define part of the fluid flow path. That is, the fluid flow path may extend through the second piston. The second piston may comprise an opening configured to allow fluid to flow through the second piston. The second piston may comprise a plurality of such openings. When the second piston is in its second position, the opening(s) may be fully covered, for example, by a wall of the (first) reference chamber. An effective cross sectional area of the opening(s) may depend on the position of the second piston. Movement of the second piston may therefore vary the effective cross sectional area of the opening(s) and thereby vary flow through the second piston. Movement of the second piston towards its second position may decrease the effective cross sectional area of the opening(s) and thereby decrease flow through the second piston. Movement of the second piston towards its first position may increase the effective cross sectional area of the opening(s) and thereby increase flow through the second piston. The opening(s) may be tapered in a direction of movement of the second piston. This may increase the change in effective cross sectional area of the opening(s) resulting from movement of the second piston by a given amount.

The (first) reference chamber may be within the fluid flow path, and may be entire within the fluid flow path so that fluid flowing between the inlet and outlet may flow around the (first) reference chamber. For example, the (first) reference chamber may be adjacent the shut-off chamber. The second piston may be actuable into and out of the (first) reference chamber.

The reference chamber for actuating the second piston may be operable to act as a shut-off chamber.

The (first) reference chamber for actuating the second piston may be operable to act as a second shut-off chamber. The first reference chamber may be fluidly connected to the second solenoid valve. The second solenoid valve may be arranged to control the pressure in the first reference chamber. The second solenoid valve may be arranged to vent the first reference chamber to the exterior of the aircraft when in the second configuration (e.g. energised). The pressure in the flow path immediately downstream of the second piston, which is higher than the vent pressure, may then cause the second piston to occupy the second position in which fluid flow through the second piston (and therefore between the inlet and the outlet) is prevented. Thus, the second solenoid may be operable to shut-off fluid flow through the PRSOV using the second piston, and may thereby provide redundancy for the shut-off function.

The PRSOV may comprise a pressure relief valve in fluid communication with the reference chamber. The pressure relief valve may be a first pressure relief valve (for example when a second pressure relief valve is provided as described herein) The reference chamber may be in fluid communication with the inlet pressure. The pressure relief valve may be operable to maintain pressure in the reference chamber below a predetermined threshold. The pressure relief valve may be arranged to vent fluid when the pressure in the reference chamber exceeds the predetermined threshold. The predetermined threshold may be any suitable threshold for controlling the PRSOV as desired, and for example may be lower than the pressure at the inlet.

In the pressure regulating mode, the position of the second piston may regulate the flow of fluid to the outlet. The second piston may be arranged so that an increase of downstream pressure above a predetermined threshold pressure differential (i.e. an increase in downstream pressure causing a pressure differential across the second piston above the predetermined pressure differential threshold) causes the second piston to move to a closed position in which fluid communication from the inlet to the outlet is prevented. If the pressure immediately downstream of the second piston exceeds the pressure in the first reference chamber, the second piston may move to reduce the fluid flow therethrough, and therefore reduce the pressure immediately downstream of the second piston. The second piston may move to reduce a metering area of the second piston. The metering area of the second piston may be the effective cross sectional area of the opening(s). If the pressure in the first reference chamber exceeds the pressure immediately downstream of the second piston, the second piston may move to increase the fluid flow therethrough and hence increase the pressure immediately downstream of the second piston. The second piston may move to increase the metering area of the second piston. If there is a pressure difference between the first reference chamber and the point immediately downstream of the second piston, the pressure difference causes the second piston to move. The movement of the second piston alters the flow of fluid to the outlet. The second piston moves to a position in which there is no pressure difference between the first reference chamber and the pressure at the point immediately downstream of the second piston. The second piston therefore operates to maintain the pressure at the point immediately downstream of the second piston at the same pressure as the first reference chamber. The second piston therefore regulates the pressure at the point immediately downstream of the second piston to be equal to the threshold pressure of the first reference chamber.

The valve body may define a reference chamber for actuating the third piston.

The reference chamber for actuating the third piston may be a second reference chamber (for example when a first reference chamber for actuating the second piston is provided). The third piston may be partially disposed in air-tight engagement with the second reference chamber. A first surface area of the third piston may be exposed to pressure in the (second) reference chamber, and the pressure within the reference chamber may be based upon a pressure upstream of the third piston. A second surface area of the third piston may be exposed to a pressure in the fluid flow path immediately downstream of the third piston. The first surface area may be of equal size to the second surface area. The position of the third piston may be determined by a difference in pressures between the pressure in the second reference chamber and the pressure in the fluid flow path immediately downstream of the third piston. For example, a downstream pressure higher than the pressure in the reference chamber may cause the third piston to move towards its second position. A downstream pressure lower than the pressure in the reference chamber may cause the third piston to move towards its first position. Thus, higher downstream pressures compared to upstream pressures may cause the third piston to reduce the fluid flow through the PRSOV. Lower downstream pressures compared to upstream pressures may cause the third piston to increase the fluid flow through the PRSOV. Thus, movement of the third piston may be responsive to upstream and downstream pressures changes and may therefore regulate fluid flow through the PRSOV based thereupon.

The third piston may define part of the fluid flow path. That is, the fluid flow path may extend through the third piston. The third piston may comprise an opening configured to allow fluid to flow through the third piston. The third piston may comprise a plurality of such openings. When the third piston is in its second position, the opening(s) may be fully covered, for example, by a wall of the reference chamber. An effective cross sectional area of the opening(s) may depend on the position of the third piston. Movement of the third piston may therefore vary the effective cross sectional area of the opening(s) and thereby vary flow through the third piston. Movement of the third piston towards its second position may decrease the effective cross sectional area of the opening(s) and thereby decrease flow through the third piston. Movement of the third piston towards its first position may increase the effective cross sectional area of the opening(s) and thereby increase flow through the third piston. The opening(s) may be tapered in a direction of movement of the third piston. This may increase the change in effective cross sectional area of the opening(s) resulting from movement of the third piston by a given amount. The opening(s) in the third piston may be larger than the opening(s) in the second piston.

The reference chamber may be within the fluid flow path, and may be entire within the fluid flow path so that fluid flowing between the inlet and outlet may flow around the reference chamber. The third piston may be actuable into and out of the reference chamber.

The PRSOV may comprise a pressure relief valve in fluid communication with the second reference chamber. The pressure relief valve may be a second pressure relief valve (for example when a first pressure relief valve is provided as described above). The second reference chamber may be in fluid communication with the inlet pressure. The pressure relief valve may be operable to maintain pressure in the second reference chamber below a predetermined threshold. The predetermined threshold may be a second predetermined threshold. The pressure relief valve may be arranged to vent fluid when the pressure in the second reference chamber exceeds the predetermined threshold. The predetermined threshold may be any suitable threshold for controlling the PRSOV as desired, and for example may be lower than the pressure at the inlet.

The third piston may be arranged so that the position of the third piston regulates the flow of fluid to the outlet in use. The third piston may be arranged so that an increase of downstream pressure above a predetermined threshold pressure differential causes the third piston to move to a closed position in which fluid communication from the inlet to the outlet is prevented. If the pressure immediately downstream of the third piston exceeds the pressure in the second reference chamber, the third piston may move to reduce the fluid flow therethrough, and therefore reduce the pressure immediately downstream of the third piston. The third piston may move to reduce a metering area of the third piston. The metering area of the third piston may be the effective cross sectional area of the opening(s) If the pressure in the second reference chamber exceeds the pressure immediately downstream of the third piston, the third piston may move to increase the fluid flow therethrough and hence increase the pressure immediately downstream of the third piston. The third piston may move to increase the metering area of the third piston.

The PRSOV may be arranged so that the third piston is actuable based on the pressure upstream of the second piston.

The second reference chamber may be fluidly connected to a point upstream of the second piston, for example by a bypass duct separate and distinct from the fluid flow path of the valve body. The bypass duct may be parallel to the fluid flow path between the inlet and the outlet. Thus, the pressure in the second reference chamber may be based upon the pressure in the fluid flow path upstream of the second piston, and may be e.g. directly proportional to that pressure. The pressure in the second reference chamber may be independent of the pressure downstream of the second piston, and may be independent of the pressure immediately upstream of the third piston. The point upstream of the second piston may be a point at which fluid is at the inlet pressure. Thus, since the pressure in the second reference chamber may be independent of the pressure downstream of the second piston, the third piston may regulate flow through the PRSOV in substantially the same way, and with substantially the same purpose, as the second piston, and hence may provide regulating function. The regulating function may be a redundant regulating function or may be a main regulating function.

The PRSOV may comprise a sense line (e.g. for the bypass duct) between the second reference chamber and the point upstream of the second piston to which the second reference chamber is connected. The sense line may be operable to transmit fluid from the point upstream of the second piston to the second reference chamber, and hence couple the pressure in the second reference chamber to the pressure upstream of the second piston. The sense line may bypass the second piston. This may improve the stability of the PRSOV because the second reference chamber is fed by the pressure at the point upstream of the second piston. Such pressure is generally more constant than pressure downstream of the second piston, due to the regulating of pressure by the second piston. Further, the third piston hence regulates fluid flow based on the appropriate pressure (e.g. the inlet pressure) instead of e.g. a pressure already regulated by the second piston.

Which of the second piston and third piston serves as the primary regulating piston depends on the relative pressures within the first reference chamber and second reference chamber, and hence upon the predetermined threshold set by the first pressure relief valve and the predetermined threshold set by the second pressure relief valve. The predetermined threshold set by the first pressure relief valve may be different from the predetermined threshold set by the second pressure relief valve. This may improve system stability because it has been found that when the pressure relief valves are set to the same predetermined threshold, an interaction between the first and second reference chambers may cause a fluttering of the second and third pistons.

The PRSOV may comprise a manual override operable to lock the second piston in the first position and/or the second position. The manual override may be a first manual override (for example when a second manual override is provided, as discussed below). The manual override may be operable from an exterior of the valve body. The manual override may be operable upon failure of the (first) pressure relief valve and/or of the second piston, to lock the second piston in its first position. The manual override may be operable to push the second piston to the first position. In the event of failure of the (first) pressure relief valve and/or of the second piston, the second piston may be pushed to and locked in the first position by the manual override, enabling fluid flow through the second piston, so that the shut-off function may be provided by the first piston and the regulating function may be provided by the third piston. The manual override may therefore ensure that failure of the (first) pressure relief valve and/or of the second piston does not lead to a loss of the regulating or shut-off function.

The PRSOV may comprise a manual override operable to lock the third piston in the first position and/or the second position. The manual override may be a second manual override (for example when a first manual override is provided, as discussed above). The manual override may be operable from an exterior of the valve body. The manual override may be operable upon failure of the (second) pressure relief valve and/or of the third piston, to lock the third piston in its first position. The manual override may be operable to push the third piston to the first position. In the event of failure of the (second) pressure relief valve and/or of the third piston, the third piston may be pushed to and locked in the first position by the manual override, enabling fluid flow through the third piston, so that the shut-off function may be provided by the first piston and the regulating function may be provided by the second piston. The manual override may therefore ensure that failure of the (second) pressure relief valve and/or of the third piston does not lead to a loss of the regulating or shut-off function.

The first solenoid valve and the second solenoid valve may be adjacent each other. The PRSOV may comprise an arm protruding from an exterior of the valve body, and the first solenoid valve and the second solenoid valve may be mounted on the arm. A pressure relief valve may be mounted on the arm. The first pressure relief valve may be mounted on the arm. The first solenoid valve and the second solenoid valve may be mounted on a first side of the arm and the first pressure relief valve may be mounted on an opposite side of the arm to the first side of the arm. The first solenoid valve, second solenoid valve and the pressure relief valve may be mutually parallel.

The valve body may be substantially rigid. The fluid flow path may be a sealed continuous cavity within the valve body. The valve body may define a core portion within the fluid flow path. The core portion may be a portion of the valve body at the core of the PRSOV surrounded by the rest of the valve body and surrounded by the fluid flow path. The valve body may define a limb to support the core portion. The limb may extend across the fluid flow path so that fluid in the fluid flow path may flow around and past the limb. The core portion may define the shut-off chamber and/or a reference chamber. The core portion may define the first reference chamber. The core portion may define the second reference chamber. The valve body may define a duct. The duct may extend from the fluid flow path to the shut-off chamber or a reference chamber. The duct may extend to the first reference chamber or the second reference chamber. The duct may comprise an orifice. The duct may be operable to transmit fluid pressure from the fluid flow path to the shut off chamber or reference chamber, and hence couple the pressure in the shut-off chamber or reference chamber to the pressure in the fluid flow path. The duct may extend from a point in the fluid flow path at which the pressure is the inlet pressure.

The PRSOV may be an anti-ice pneumatic valve e.g. for an aircraft anti-ice system.

According to a second aspect of the present invention, there is provided an aircraft comprising the pressure regulating shut-off valve (PRSOV) of the first aspect of the invention. The aircraft may comprise an anti-ice system comprising the PRSOV.

According to a third aspect of the present invention, there is provided a method of operating an aircraft anti-ice system comprising providing a pressure regulating shut-off valve (PRSOV) comprising a first piston, a second piston and a third piston, the method comprising configuring both the second piston and the third piston to regulate fluid flow through the PRSOV. The method may comprise regulating fluid flow through the PRSOV using both the second piston and the third piston, for example at different times.

The method may therefore comprise using either the second piston or the third piston as a redundant regulating piston to the other of the second piston or the third piston.

The method may comprise configuring the first piston and the second piston as shut-off pistons. The method may comprise using both the first piston and the second piston as a shut-off piston, for example at different times. The method may therefore comprise providing the second piston as both a redundant shut-off piston and a regulating piston.

The method may comprise using and/or providing a pressure regulating shut-off valve as described herein with reference to the first aspect of the invention, and/or using and/or providing an aircraft as described herein with reference to the second aspect of the present invention. The method may comprise using and/or providing any of the features described herein with reference to any aspect of the invention.

According to another aspect of the invention, there is provided a triple-piston pressure regulating shut-off valve (PRSOV), comprising a first piston, a second piston, and a third piston.

The first piston, second piston, and third piston may be in series. The first piston may provide a shut-off function. The second piston may comprise a redundant shut-off function, and the third piston may provide a redundant regulating function. Alternatively, the triple piston PRSOV may be configured so that the second piston provides the redundant regulating function. The triple piston PRSOV may comprise any of the features recited herein with reference to the first aspect of the invention and/or the second aspect of the invention.

BRIEF DESCRIPTION OF THE DRAWINGS

Certain preferred embodiments of the invention are described below by way of example only and with reference to the accompanying figures in which.

DETAILED DESCRIPTION

Figure 1:
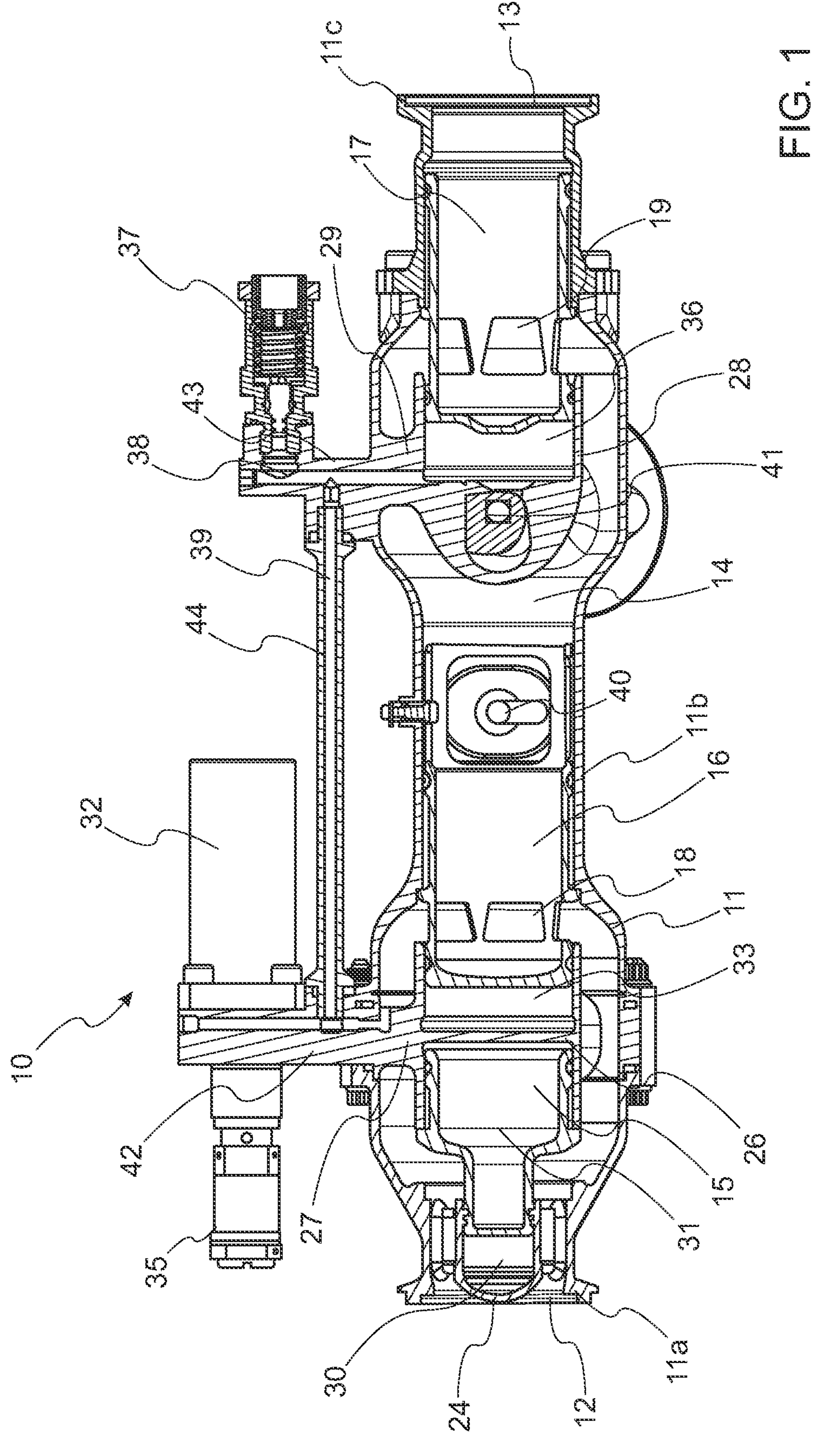
FIG. 1 shows a cross-section of a pressure regulating shut-off valve.

FIG. 1 shows a pressure regulating shut-off valve (PRSOV) 10 comprising a valve body 11 defining an inlet 12, an outlet 13 and a fluid flow path 14 between the inlet 12 and the outlet 13. The PRSOV 10 includes a first piston 15 operable as a shut-off piston, a second piston 16 operable as a shut-off piston and as a regulating piston, and a third piston 17 operable as a regulating piston. The PRSOV is an anti-ice pneumatic valve for use in an aircraft e.g., in an aircraft anti-ice system.

The valve body 11 is substantially rigid, and all parts of the valve body 11 are stationary with respect to the other parts. The valve body 11 comprises an inlet member 11*a*, a central member 11*b* and an outlet member 11*c*. The inlet member 11*a* defines the inlet 12 and part of the fluid flow path 14. The central member 11*b* defines part of the fluid flow path 14 between the inlet member 11*a* and the outlet member 11*c*. The outlet member 11*c* defines the outlet 13 and part of the fluid flow path 14. The inlet member 11*a* is joined to the central member 11*b* and the central member 11*b* is joined to the outlet member 11*c* e.g., to thereby provide the valve body 11. Flanges are defined on each of the inlet member 11*a*, central member 11*b* and outlet member 11*c* to facilitate the joins e.g., via any suitable coupling. A seal (not shown) is provided between the inlet member 11*a* and the central member 11*b* and between the central member 11*b* and the outlet member 11*c*. In other embodiments, the valve body 11 is provided as a one-piece component e.g., as a unitary component formed from a single material.

The fluid flow path 14 is formed as a sealed continuous cavity within the valve body 11, extending between the inlet 12 and the outlet 13. In use, fluid enters via the inlet 12 and flows through the fluid flow path 14 in the left to right direction as seen in FIG. 1, then out of the outlet 13. The term upstream will be understood to indicate a direction generally towards the inlet 12, that is, to the left in FIG. 1. The term downstream will be understood to indicate a direction generally towards the outlet 13, that is, to the right in FIG. 1.

The valve body 11 defines a first core portion 24, a second core portion 26 and a third core portion 28 within the fluid flow path 14. Each of the first core portion 24, second core portion 26 and third core portion 28 is a portion of the valve body 11 at the core of the PRSOV 10, surrounded by the rest of the valve body 11. The fluid flow path 14 flows around the first core portion 24, second core portion 26 and third core portion 28.

The valve body 11 defines a first limb (not shown) provided to support the first core portion 24 within the fluid flow path 14. Further limbs (not shown) may be provided to support the first core portion 24. The first limb extends across the fluid flow path 14. The valve body 11 defines a second limb 27 provided to support the second core portion 26 within the fluid flow path 14. Further limbs (not shown) may be provided to support the second core portion 26. The second limb 27 extends across the fluid flow path 14 so that fluid in the fluid flow path 14 flows around and past the second limb 27. The valve body 11 defines a third limb 29 provided to support the third core portion 28 within the fluid flow path 14. Further limbs (not shown) may be provided to support the third core portion 28. The third limb 29 extends across the fluid flow path 14 so that fluid in the fluid flow path 14 flows around and past the third limb 29.

The first piston 15 comprises a nose portion, a shoulder portion and a flank portion. The first piston 15 is substantially rigid. The first piston 15 is a one-piece component. The first piston 15 is rotationally symmetric about an axis. The nose portion is joined to the shoulder portion. The shoulder portion extends radially and axially from a base of the nose portion. The shoulder portion defines a substantially conical wall. The flank portion is joined to the shoulder portion. The flank portion extends axially from an outer edge of the shoulder portion. The flank portion defines a substantially cylindrical wall.

The nose portion of the first piston 15 is slidably received in the first core portion 24. The nose portion of the first piston 15 cooperates with the first core portion 24 to define a nose chamber 30. The first piston 15 cooperates with the first core portion 24 to seal the nose chamber 30 from the fluid flow path 14. The nose chamber 30 is vented to the atmosphere and is therefore at ambient pressure so that the nose portion of the first piston 15 can move easily into or out of the nose chamber 30.

The flank portion of the first piston 15 is slidably received in the second core portion 26. The first piston 15 is in partial air tight engagement with the second core portion 26 to define a shut-off chamber 31. The first piston 15 cooperates with the second core portion 26 to seal the shut-off chamber 31 from the fluid flow path 14.

The first piston 15 is therefore moveable along its axis relative to the valve body 11. The first piston 15 is moveable between a first position (e.g. rightmost in the orientation shown in FIG. 1) and a second position (e.g. leftmost in the orientation shown in FIG. 1). In the first position, fluid may flow from the inlet 12 of the PRSOV 10 to the outlet 13 of the PRSOV 10. It will be understood that other components of the PRSOV 10 such as the second piston 16 may nevertheless block the flow of fluid from the inlet 12 to the outlet 13 when the first piston 15 is in the first position. The first piston 15 is shown in the first position in FIG. 1. In the second position the first piston 15 blocks flow of fluid from the inlet 12 of the PRSOV to the outlet 13 of the PRSOV. In the second position the shoulder portion of the first piston 15 abuts a projection formed by the valve body 11 in the fluid flow path 14 to thereby seal the fluid flow path 14.

The position of the first piston 15 is determined by the balance of pressure across the first piston 15. The pressure in the shut-off chamber 31 acts on an inner surface of the shoulder portion and on an inner surface of the nose portion. The pressure in the fluid flow path 14 acts on an outer surface of the shoulder portion. The pressure in the nose chamber 30 acts on an outer surface of the nose portion.

The PRSOV comprises a first solenoid valve 32. The body 11 comprises a first arm 42 protruding from an exterior of the body 11. The first solenoid valve 32 is mounted on the first arm 43. When the first solenoid valve 32 is de-energised, the shut-off chamber 31 is vented to atmosphere. In this condition, the outer surface of the shoulder portion is exposed to inlet pressure in the fluid flow path 14, the outer surface of the nose portion is exposed to vent pressure in the nose chamber 30 and the inner surfaces of the nose portion and shoulder portion are exposed to vent pressure in the shut-off chamber 31. The balance of pressures across the first piston 15 is therefore such as to force it towards the first position. The first piston 15 will therefore travel to the first position and be held in the first position by the balance of pressures.

The shut-off chamber 31 is connected to a point in the fluid flow path 14 upstream of the first piston 15 via a duct (not shown), for example when the first solenoid valve 32 is energised. If suitable, the shut-off chamber 31 may always be in fluid communication with the point in the fluid flow path 14 upstream of the first chamber 15 e.g., via a suitably configured orifice. The duct extends from the second core portion 26, through the second limb 27. When the first solenoid valve 32 is energised, the shut-off chamber 31 is not vented to atmosphere. In this condition, the outer surface of the shoulder portion is exposed to inlet pressure in the fluid flow path 14, the outer surface of the nose portion is exposed to vent pressure in the nose chamber 30 and the inner surfaces of the nose portion and shoulder portion are exposed to pressure proportional to the inlet pressure in the shut-off chamber 31. The shut-off chamber may be at inlet pressure in this configuration. Because a greater surface area of the first piston 15 is exposed to the inlet pressure on the inner side of the first piston 15, compared to the outer side of the first piston 15, the balance of pressures across the first piston 15 is such as to force it towards the second position. The first piston 15 will therefore travel to the second position and be held in the second position by the balance of pressures.

The second piston 16 comprises a cylindrical side wall. The cylindrical side wall is closed at an upstream end by an end wall and is open at a downstream end. A plurality of openings 18 is defined in the cylindrical side wall. The plurality of openings 18 is disposed proximal to the upstream end of the second piston 16. The openings 18 are evenly distributed about a circumference of the second piston 16. Each of the openings 18 is tapered in a downstream direction. That is, the openings 18 are widest at their most upstream point, and narrower downstream. The second piston 16 is substantially rigid. The second piston 16 is a one-piece component. The second piston 16 is rotationally symmetric about an axis.

An upstream end of the second piston 16 is slidably received in the second core portion 26. The second piston 16 cooperates with the second core portion 26 to define a first reference chamber 33. The second piston 16 cooperates with the second core portion 26 to seal the first reference chamber 33 from the fluid flow path 14.

A downstream end of the second piston 16 is slidably received in the valve body 11. The valve body 11 defines a sleeve for receiving the downstream end of the second piston 16. The second piston 16 is in partial air tight engagement with the sleeve. The fluid flow path 14 therefore passes through the openings of the second piston 16, and out of the open downstream end of the second piston 16.

The second piston 16 is therefore moveable along its axis relative to the valve body 11. The second piston 16 is moveable between a first position (rightmost in the orientation of FIG. 1) and a second position (leftmost in the orientation in FIG. 1).

In the first position, fluid may flow from the inlet 12 of the PRSOV 10 to the outlet 13 of the PRSOV 10. It will be understood that other components of the PRSOV 10 such as the first piston 15 may nevertheless block the flow of fluid from the inlet 12 to the outlet 13 when the second piston 16 is in the first position. The second piston 16 is shown in the first position in FIG. 1. In the second position, the second piston 16 blocks flow of fluid from the inlet 12 of the PRSOV to the outlet 13 of the PRSOV. In the second position, the openings of the second piston 16 are fully blocked by the second core portion 26.

The second piston 16 may also occupy a continuous range of positions between the first and second positions. In at least a subset of the continuous range of positions, the openings of the second piston 16 are partially blocked by the second core portion 26. This causes a variable narrowing in the cross section of the fluid flow path 14, depending on the position of the second piston 16. As the second piston 16 travels in an upstream direction (to the left in FIG. 1), the openings of the second piston 16 are progressively more blocked by the second core portion 26 and flow becomes more constricted.

The position of the second piston 16 is determined by the balance of pressure across the second piston 16. The pressure in the first reference chamber 33 acts on an outer surface of the end wall of the second piston 16. The pressure in the fluid flow path 14 acts on an inner surface of the end wall of the second piston 16.

Figure 3:
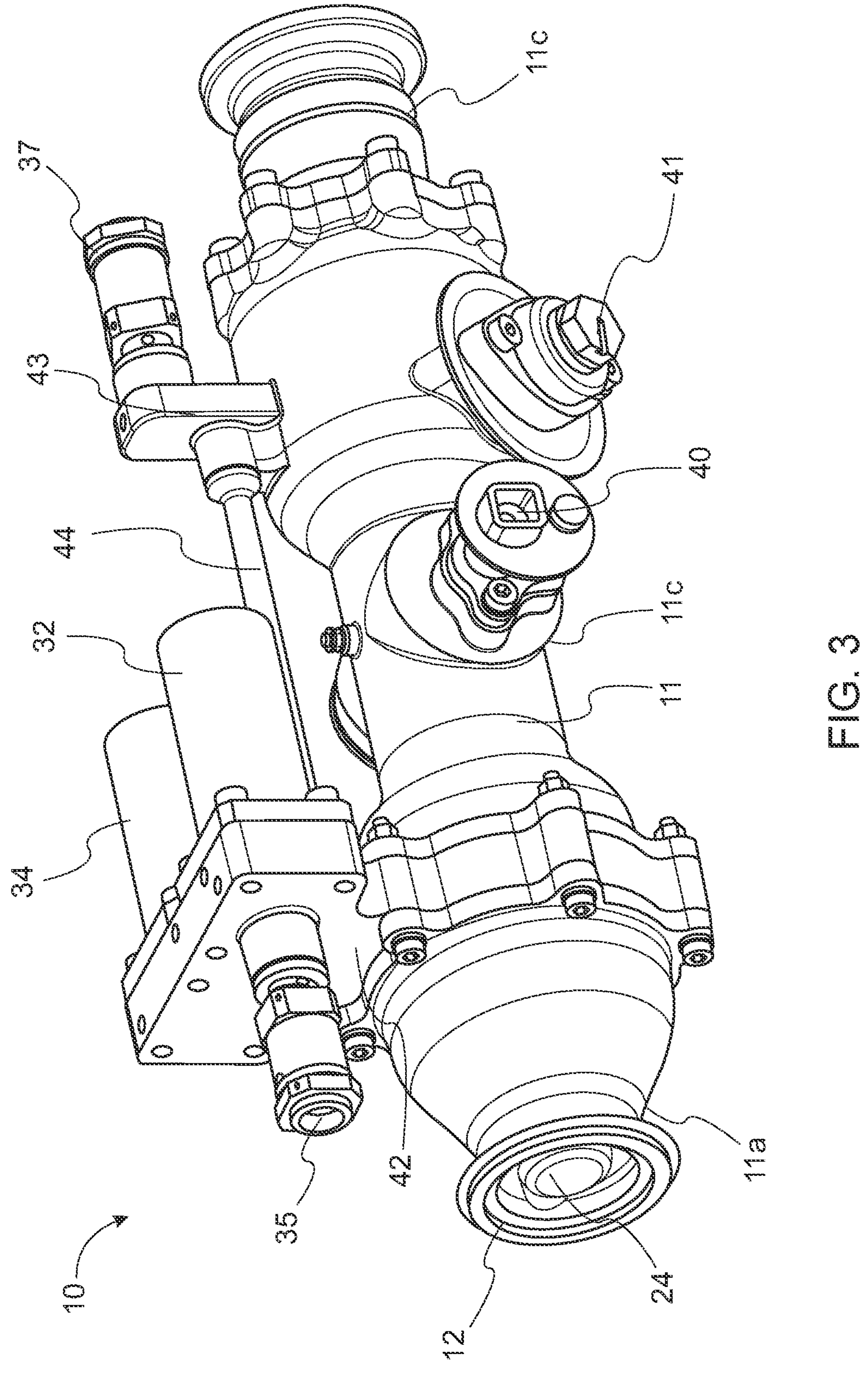
FIG. 3 shows a perspective view of the pressure regulating shut-off valve of FIG. 1.

The PRSOV 10 comprises a second solenoid valve 34 (see e.g. FIG. 3). The second solenoid valve 34 is mounted on the first arm 42. When the second solenoid valve 34 is energised, the first reference chamber 33 is vented to atmosphere. In this condition, the inner surface of the end wall of the second piston 16 is exposed to pressure in the fluid flow path 14 and the outer surface of the end wall of the second piston 16 is exposed to vent pressure in the first reference chamber 33. Because the pressure in the fluid flow path 14 is greater than vent pressure, the balance of pressures across the second piston 16 is such as to force it towards the second position. The second piston 16 will therefore travel to the second position and be held in the second position by the balance of pressures.

The PRSOV 10 comprises a first pressure relief valve (PRV) 35. The first PRV 35 is mounted on the first arm 42. The first PRV 35 is fluidly connected to the first reference chamber 33 via a duct (not shown). The duct extends from the second core portion 26 through the second limb 27 and first arm 42. The first reference chamber 33 is also fluidly connected to the inlet pressure via a further duct (not shown). The first PRV 35 is operable to maintain pressure in the first reference chamber 33 below a predetermined threshold. The first PRV 35 is arranged to vent fluid when the pressure in the first reference chamber 33 exceeds the predetermined threshold. The threshold is lower than the pressure at the inlet. The first PRV 35 therefore operates to maintain the first reference chamber 33 at a first reference pressure, while the second solenoid valve 34 is de-energised.

In this condition, the outer surface of the end wall of the second piston 16 is exposed to the first reference pressure in the first reference chamber 33 and the outer surface of the end wall of the second piston 16 is exposed to pressure in the fluid flow path 14 immediately downstream of the second piston 16 (that is, within the cylindrical wall of the second piston 16). The outer and inner surfaces of the end wall of the second piston 16 are of equal area. The balance of pressures across the second piston 16 is therefore such as to force it towards an equilibrium position. The equilibrium position is a point between the first position and the second position at which pressure in the flow path 14 immediately downstream of the second piston 16 is equal to the pressure in the first reference chamber 33. When the second solenoid valve 34 is de-energised, the second piston 16 therefore operates to regulate pressure in the fluid flow path 14.

The PRSOV 10 comprises a first manual override 40. The first manual override 40 is operable to lock the second piston 16 in the first position (and therefore override its regulating function). The first manual override 40 comprises an arm, mounted on a shaft. The arm is disposed in the flow path 1. The cylindrical side wall of the second piston 16 defines a second opening disposed proximal to the downstream end of the second piston 16. The arm is received in the second opening. The shaft extends through the valve body 11 from the fluid flow path 14 to the exterior of the PRSOV 10. The shaft is rotatably mounted in the valve body 11 and is sealed to the valve body 11. A gripping feature such as a nut or lever arm is joined to the shaft on the exterior of the PRSOV 10. By rotating the gripping feature, a user may cause the arm to rotate within the fluid flow path 14 into a position in which the arm abuts the edge of the second opening of the second piston 16, holding the second piston 16 in the first position. Rotation of the arm may force the second piston 16 into the first position. This allows the second piston 16 to be locked in an open position in the event of failure of the first PRV 35 or second piston 16. Of course, any suitable manual override may be used.

The third piston 17 comprises a cylindrical side wall. The cylindrical side wall is closed at an upstream end by an end wall and is open at a downstream end. A plurality of openings 19 is defined in the cylindrical side wall. The plurality of openings 19 is disposed proximal to the upstream end of the third piston 17. The openings 19 are evenly distributed about a circumference of the third piston 17. Each of the openings is tapered in a downstream direction. That is, the openings are widest at their most upstream point, and narrower downstream. The third piston 17 is substantially rigid. The third piston 17 is a one-piece component. The third piston 17 is rotationally symmetric about an axis.

An upstream end of the third piston 17 is slidably received in the third core portion 28. The third piston 17 cooperates with the third core portion 28 to define a second reference chamber 36. The third piston 17 cooperates with the third core portion 28 to seal the third piston 17 from the fluid flow path 14.

A downstream end of the third piston 17 is slidably received in the valve body 11. The valve body 11 defines a sleeve for receiving the downstream end of the third piston. The third piston 17 is in partial air-tight engagement with the sleeve. The fluid flow path 14 therefore passes through the openings of the third piston 17 and out of the open downstream end of the third piston 17.

The third piston 17 is therefore moveable along its axis relative to the valve body 11. The third piston 17 is moveable between a first position (rightmost in the orientation of FIG. 1) and a second position (leftmost in the orientation of FIG. 1). In the first position, fluid may flow from the inlet 12 of the PRSOV 10 to the outlet 13 of the PRSOV 10. Other components of the PRSOV 10 such as the first piston 15 may nevertheless block the flow of fluid from the inlet 12 to the outlet 13 when the third piston 17 is in the first position. The third piston 17 is shown in the first position in FIG. 1. In the second position the third piston 17 blocks flow of fluid from the inlet 12 of the PRSOV to the outlet 13 of the PRSOV. In the second position the openings 19 of the third piston 17 are fully blocked by the second core portion 26. In other embodiments, the third piston 17 may not fully block the flow of fluid in the second position. The third piston 17 may also occupy a continuous range of positions between the first and second positions. In at least a subset of the continuous range of positions, the openings 19 of the third piston 17 are partially blocked by the third core portion 28. This causes a variable narrowing in the cross section of the fluid flow path 14, depending on the position of the third piston 17. As the third piston 17 travels in an upstream direction (to the left in FIG. 1), the openings of the third piston 17 are progressively more blocked by the third core portion 28 and flow becomes more constricted.

The position of the third piston 17 is determined by the balance of pressure across the third piston 17. The pressure in the first reference chamber 33 acts on an outer surface of the end wall of the third piston 17. The pressure in the fluid flow path 14 acts on an inner surface of the end wall of the third piston 17.

The PRSOV 10 comprises a second pressure relief valve (PRV) 37. The body 11 comprises a second arm 43. The second arm 43 extends from an exterior of the body 11. The second arm 43 is connected to the third arm 42 by a sense line 44. The sense line 44 is a rigid tubular body extending between the first arm 42 and the second arm 43 on the exterior of the body 11. The second PRV 37 is mounted on the second arm 43. The second PRV 37 is fluidly connected to the second reference chamber 36 via a duct 38. The duct 38 extends from the third core portion 28 through the third limb 29 and the second arm 43. The second reference chamber 36 is also fluidly connected to the inlet pressure via a further bypass duct 39. The bypass duct 39 is provided in parallel to the fluid flow path 14. The bypass duct 39 extends from the third core portion 28 through the second arm 43, the sense line 44 and the first arm 42 to a point on the fluid flow path 14 upstream of the second piston 16. The pressure at this point is substantially equal to the inlet pressure, as this point is upstream of the second and third pistons 16, 17 and the first piston 15 does not regulate the pressure in the fluid flow path 14. Thus, pressure in the second reference chamber 36 may be independent of pressure immediately downstream of the second piston 16.

The second PRV 37 is operable to maintain pressure in the second reference chamber 36 below a predetermined threshold. The second PRV 37 is arranged to vent fluid when the pressure in the second reference chamber 36 exceeds the threshold. The predetermined threshold is lower than the pressure at the inlet. The second PRV 37 therefore operates to maintain the second reference chamber 36 at a second reference pressure. The first and second reference pressures may be set by a user by adjusting the first and second PRVs 35, 37, respectively. They may be set equal or they may differ.

In this condition, the outer surface of the end wall of the third piston 17 is exposed to the pressure in the second reference chamber 36 and the outer surface of the end wall of the third piston 17 is exposed to pressure in the fluid flow path 14 immediately downstream of the third piston 17 (that is, within the cylindrical wall of the third piston 17). The outer and inner surfaces of the end wall of the third piston 17 are of equal area. The balance of pressures across the third piston 17 is therefore such as to force it towards an equilibrium position. The equilibrium position is a point between the first position and the second position at which pressure in the fluid flow path 14 immediately downstream of the third piston 17 is equal to the second reference pressure. The third piston 17 therefore operates to regulate pressure in the fluid flow path 14.

The PRSOV 10 comprises a second manual override 41. The second manual override 41 is operable to lock the third piston 17 in the first position. The second manual override 41 comprises a cam, mounted on a shaft. The cam is disposed adjacent the second reference chamber 36. The shaft extends through the valve body 11 from the fluid flow path 14 to the exterior of the PRSOV 10. The shaft is rotatably mounted in the valve body 11 and is sealed to the valve body 11. A gripping feature such as a nut or lever arm is joined to the shaft on the exterior of the PRSOV 10. By rotating the gripping feature, a user may cause the cam to rotate into the second reference chamber 36 to abut the upstream end of the third piston 17, holding the third piston 17 in the first position. Rotation of the cam may force the third piston 17 into the first position. This allows the third piston 17 to be locked in an open position in the event of failure of the second PRV 37 or third piston 17.

The PRSOV 10 is, therefore, a triple-piston PRSOV. The PRSOV 10 may provide improved redundancy for the shut-off function and the regulating function, while allowing a relatively small envelope size and weight. In normal operation, either the second piston 16 or the third piston 17 may provide the main regulating function depending upon the configuration of the PRSOV 10, and may therefore serve as a primary regulating piston. The other of the second piston 16 and the third piston 17 may then serve as a redundant regulating piston. If the third piston 17 or the second pressure relief valve 37 fails, the first piston 15 provides the shut-off function and the second piston 16 provides the regulating function. If the second piston 16 or the first pressure relief valve 35 fails, the first piston 15 provides the shut-off function and the third piston 17 provides the regulating function. Redundancy is therefore provided for the regulating function in the event of a single piston failure. If both the second piston 16 and the third piston 16 fail, the first piston provides 15 the shut-off function and the regulating function is lost.

The second piston 16 is also operable as a redundant shut-off piston. Therefore, if the first piston 15 fails, then the second piston 16 may provide the shut-off function. Alternatively, the second piston 16 may provide a primary shut-off function and the first piston 15 may provide a redundant shut-off function, depending upon the configuration of the PRSOV 10. Redundancy is therefore also provided for the shut-off function of the PRSOV 10 as well as for the pressure regulating function. The PRSOV 10 may therefore provide dual redundancy, for both the shut-off function and the pressure regulating function.

The PRSOV 10 may occupy a relatively small envelope and may have a relatively low weight, because the regulating and shut-off functions and their respective redundancies are combined in a single body, that is, the valve body 11. Further, only three pistons are required to provide this level of redundancy. The envelope and weight of the PRSOV 10 may therefore be comparable to the envelope and weight of two single piston valves in series, while providing improved redundancy. The envelope and weight of the PRSOV 10 may be less than that of e.g. two dual piston valves in series, that might otherwise be needed to achieve the same level of redundancy.

Figure 2:
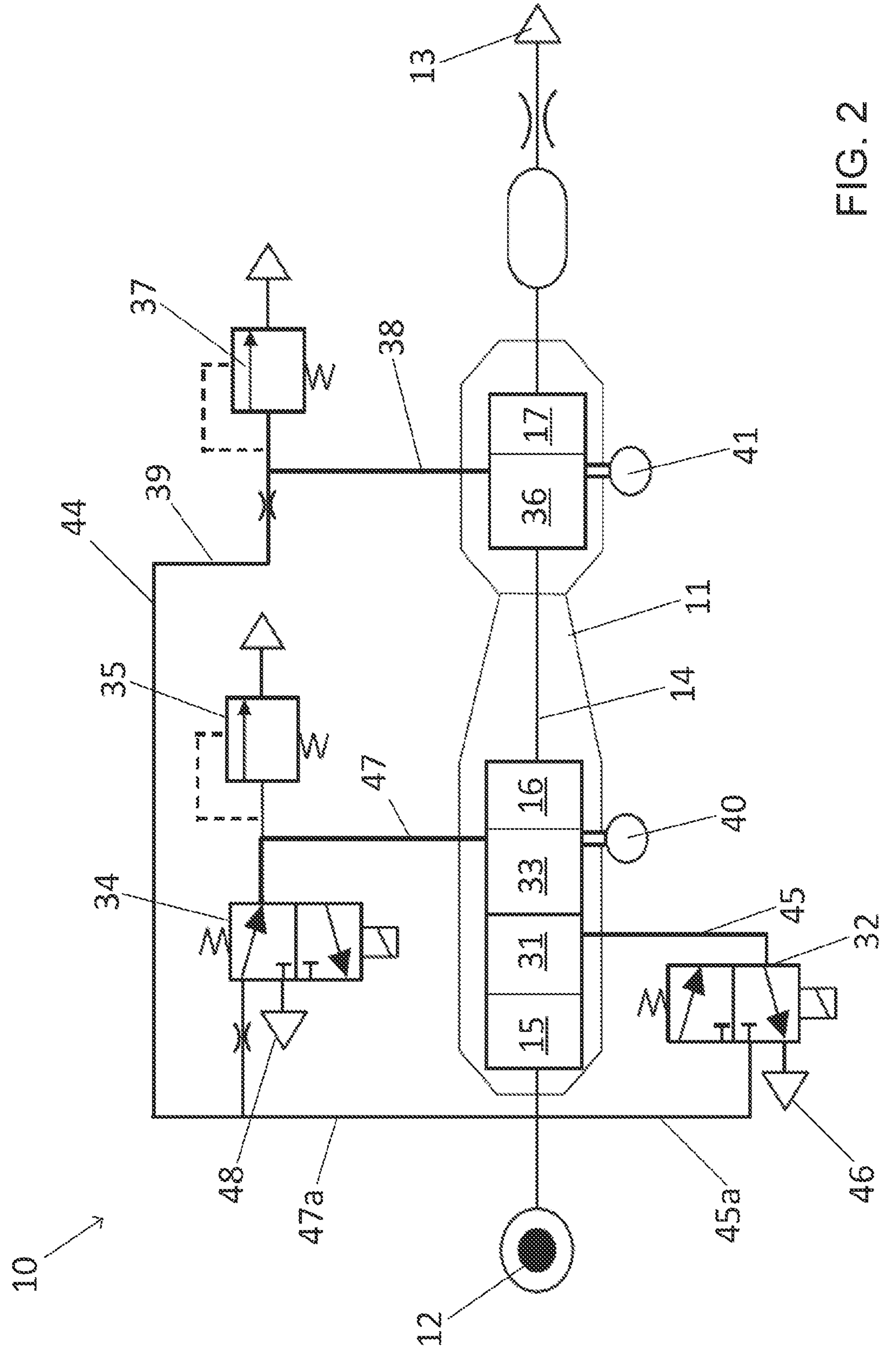
FIG. 2 shows a schematic of the pressure regulating shut-off valve of FIG. 1.

FIG. 2 shows a schematic of the PRSOV 10 of FIG. 1. The shut-off chamber 31 is connected to the first solenoid valve 32 via a duct 45. Depending on the state of the first solenoid valve, the shut-off chamber 31 is connected to either inlet pressure in the fluid flow path 14 via a further duct 45*a*, or to a vent 46. The vent 46 is connected to the atmosphere.

In FIGS. 1 and 2, the first solenoid valve 32 is shown in a de-energised state and the shut-off chamber 31 is connected to the vent 46. The pressure in the shut-off chamber is therefore the vent pressure, which is lower than the pressure in the fluid flow path 14. The first piston 15 is therefore in the first position.

When the first solenoid valve 32 is energised, the shut-off chamber 31 is disconnected from the vent 46 and connected instead to the inlet pressure in the fluid flow path 14 via the further duct 45*a*. The pressure in the shut-off chamber 31 is therefore proportional to the inlet pressure in the fluid flow path 14 and the first piston 15 will occupy the second position.

In other embodiments, the configuration of the first solenoid valve 32 may be reversed, such that the shut-off chamber 31 is connected to the vent 46 when the first solenoid valve 32 is energised and connected the inlet pressure in the first fluid flow path 14 when the first solenoid valve 32 is de-energised.

The first reference chamber 33 is connected to the second solenoid valve 34 via a duct 47. Depending on the state of the second solenoid valve 34, the first reference chamber 33 is connected to either inlet pressure in the fluid flow path 14 via a further duct 47*a*, or to a vent 48. The vent 48 is connected to the atmosphere. The first reference chamber 33 is also connected to the first PRV 35 via the duct 47.

In FIGS. 1 and 2, the second solenoid valve 34 is shown in a de-energised state and the first reference chamber 33 is connected to inlet pressure in the fluid flow path 14 via the further duct 47*a* and to the first PRV 35 via the duct 47. The pressure in the first reference chamber 33 is therefore set by the predetermined threshold pressure of the first PRV 35. The second piston 16 is therefore operating in a pressure regulating mode.

When the second solenoid valve 34 is energised, the first reference chamber 33 is disconnected from the further duct 47*a* and instead connected to the vent 48. The pressure in the first reference chamber 33 is therefore the vent pressure and the second piston 16 will occupy the second position.

In other embodiments, the configuration of the second solenoid valve 34 may be reversed, such that the first reference chamber 33 is connected to the inlet pressure in the fluid flow path 14 via the further duct 47*a* when the second solenoid valve 34 is energised and connected to the vent 48 when the second solenoid valve 34 is de-energised.

The second reference chamber 36 is connected to inlet pressure in the fluid flow path 14 via duct 38 and bypass duct 39. The second reference chamber 36 is also connected to the second PRV 37 via the duct 38.

The pressure in the second reference chamber 36 is therefore set by the predetermined threshold pressure of the second PRV 37. The third piston 17 is therefore operating in a pressure regulating mode.

FIG. 3 shows a perspective view of the PRSOV 10 of FIG. 1. The first solenoid valve 32, second solenoid valve 34 and first pressure relief valve (PRV) 35 are mounted on the first arm 42 in a mutually parallel arrangement, parallel with the fluid flow path 14. The first solenoid valve 32 and second solenoid valve 34 are mounted on a first side of the first arm 42. The first side of the first arm 42 is a downstream side. The first PRV 35 is mounted on a second side of the first arm 42, opposite the first solenoid valve 32 and second solenoid valve 34. The second side of the first arm 42 is an upstream side. The first and second solenoid valves 32, 34 are therefore mounted downstream of the first PRV 35 and the first PRV 35 extends away from the first and second solenoid valves 32, 34 in an upstream direction. This ensures that fluid venting from the first PRV 35 does not impact the first and second solenoid valves 32, 34.

The second PRV 37 is mounted on the second arm 43 parallel with the fluid flow path 14. The second PRV 37 is mounted on a downstream side of the second arm 43. The second arm 43 is disposed downstream of the first arm 42. The second PRV 37 therefore extends away from the first and second solenoid valves 32, 34 in a downstream direction. This ensures that fluid venting from the second PRV 37 does not impact the first and second solenoid valves 32, 34.

The sense line 44 extends between the first arm 42 and the second arm 43 parallel to the fluid flow path 14 and spaced from the valve body 11. The gripping feature of the first manual override 40 and the gripping feature of the second manual override 41 are accessible from the exterior of the PRSOV 10.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. A pressure regulating shut-off valve for an aircraft anti-ice system comprising:
- a valve body defining an inlet and an outlet, and a fluid flow path between the inlet and the outlet;
- a first piston operable as a shut-off piston, the first piston being actuable between a first position in which fluid flow between the inlet and the outlet is permitted, and a second position in which fluid flow between the inlet and the outlet is prevented;
- a second piston operable as a shut-off piston and as a regulating piston, the second piston being actuable between a first position in which fluid flow between the inlet and the outlet is permitted and a second position in which fluid flow between the inlet and the outlet is prevented, and being actuable to regulate flow between the inlet and the outlet; and
- a third piston operable as a regulating piston, the third piston being actuable to regulate flow between the inlet and the outlet;
- wherein the valve body defines a first reference chamber for actuating the second piston and second reference chamber for actuating the third piston, the valve further comprising:
- a first pressure relief valve located on a first arm and fluidly coupled for the first reference chamber;
- a second pressure relief valve located on a second arm and fluidly coupled to the second reference chamber; and
- a bypass duct that fluidly couples the first arm and the second arm for actuating the third piston.

2. The pressure regulating shut-off valve of claim 1, wherein the first piston is upstream of the second piston.

3. The pressure regulating shut-off valve of claim 1, wherein the second piston is upstream of the third piston.

4. The pressure regulating shut-off valve of claim 1, further comprising:
- a solenoid valve operable to actuate the first piston.

5. The pressure regulating shut-off valve of claim 1, further comprising:
- a solenoid valve operable to actuate the second piston.

6. The pressure regulating shut-off valve of claim 1, wherein the first reference chamber for actuating the second piston is operable to act as a shut-off chamber.

7. The pressure regulating shut-off valve of claim 1, wherein the valve is an anti-ice pneumatic valve.

8. An aircraft comprising:
- a pressure regulating shut-off valve of claim 1.

9. A method of operating an aircraft anti-ice system comprising:
- providing a pressure regulating shut-off valve having a valve body and comprising a first piston, a second piston and a third piston and that defines a fluid flow path, wherein the valve body includes:
- a first pressure relief valve located on a first arm and fluidly coupled for the first reference chamber;
- a second pressure relief valve located on a second arm and fluidly coupled to the second reference chamber;
- and
- configuring both the second piston and the third piston to regulate fluid flow through the pressure regulating shut-off valve, wherein configuring includes:
- fluidly connecting the first reference chamber for actuating the second piston to the first pressure relief valve;
- fluidly connecting the second reference chamber for actuating the third piston to the second pressure relief valve; and
- fluidly connecting via a bypass duct the first arm to the second arm to allow for actuation of the third piston.

10. The method as claimed in claim 9, further comprising actuating the third piston based upon the pressure upstream of the second piston.

11. The method as claimed in claim 9, comprising configuring the first piston and the second piston as shut-off pistons.

12. A method as claimed in claim 9, wherein the pressure regulating shut-off valve is a pressure regulating shut-off valve as claimed in claim 1.

* * * * *